United States Patent [19]

Furumiya et al.

[11] Patent Number: 5,298,998
[45] Date of Patent: Mar. 29, 1994

[54] SYNCHRONOUS CLOCK GENERATOR AND TIME-BASE ERROR CORRECTOR

[75] Inventors: Shigeru Furumiya, Katano; Yoshinari Takemura, Settu, both of Japan

[73] Assignee: Matsushita Electric Industrial Co., Ltd., Osaka, Japan

[21] Appl. No.: 982,373

[22] Filed: Nov. 25, 1992

[30] Foreign Application Priority Data

Nov. 27, 1991 [JP] Japan ................................ 3-312092

[51] Int. Cl.⁵ ............................................. H04N 5/04
[52] U.S. Cl. .................................. 348/537; 358/337; 331/20; 348/148; 348/525
[58] Field of Search ............... 358/148, 150, 151, 158, 358/159, 160, 320, 321, 323, 325, 326, 337, 339; 331/10, 20, 11, 12, 17, 18; H04N 5/04

[56] References Cited

U.S. PATENT DOCUMENTS

| | | | |
|---|---|---|---|
| 4,417,218 | 11/1983 | Berke | 358/158 |
| 4,688,094 | 8/1987 | Tanabe et al. | 358/158 |
| 4,989,073 | 1/1991 | Wagner | 358/326 |
| 5,062,005 | 10/1991 | Kitaura et al. | 358/320 |
| 5,168,360 | 12/1992 | Maeshima | 358/158 |
| 5,184,091 | 2/1993 | Srivastava | 358/158 |

FOREIGN PATENT DOCUMENTS 62-110382  5/1987  Japan.

Primary Examiner—James J. Groody
Assistant Examiner—Michael H. Lee
Attorney, Agent, or Firm—Wenderoth, Lind & Ponack

[57] ABSTRACT

In a clock generator circuit, a zero hold circuit produces from a fixed clock signal a zero hold clock signal which is in phase with an external sync signal. A phase comparator circuit produces phase difference data indicating the phase difference between the external sync signal and an internal sync signal. A counter cleared by the external sync signal counts pulses of the zero hold clock signal to obtain count data. A memory receiving the phase difference data and the count data as its address input produces the internal sync signal when the count data is smaller than the number of pulses in one cycle of the external sync signal having no time-base variations, and a phase control signal determined by the phase difference data and the count data. A phase shifter shifts the phase of the zero hold clock according to the phase control signal to obtain a modified clock signal synchronized with the external sync signal.

8 Claims, 7 Drawing Sheets

| INPUT | | | | | | | | OUTPUT | | |
|---|---|---|---|---|---|---|---|---|---|---|
| 7 | 6 | 5 | 4 | 3 | 2 | 1 | 0 | 2 | 1 | 0 |
| L | L | L | L | H | H | H | H | L | L | L |
| L | L | L | H | H | H | H | L | L | L | H |
| L | L | H | H | H | H | L | L | L | H | L |
| L | H | H | H | H | L | L | L | L | H | H |
| H | H | H | H | L | L | L | L | H | L | L |
| H | H | H | L | L | L | L | H | H | L | H |
| H | H | L | L | L | L | H | H | H | H | L |
| H | L | L | L | L | H | H | H | H | H | H |

| INPUT | | | | | | | | OUTPUT | | | |
|---|---|---|---|---|---|---|---|---|---|---|---|
| 7 | 6 | 5 | 4 | 3 | 2 | 1 | 0 | 3 | 2 | 1 | 0 |
| L | L | L | L | L | L | L | L | H | L | L | L |
| H | L | L | L | L | L | L | L | L | L | L | H |
| H | H | L | L | L | L | L | L | L | L | H | L |
| H | H | H | L | L | L | L | L | L | L | H | H |
| H | H | H | H | L | L | L | L | L | H | L | L |
| H | H | H | H | H | L | L | L | L | H | L | H |
| H | H | H | H | H | H | L | L | L | H | H | L |
| H | H | H | H | H | H | H | L | L | H | H | H |
| H | H | H | H | H | H | H | H | H | H | H | H |

SYNCHRONOUS CLOCK GENERATOR AND TIME-BASE ERROR CORRECTOR

BACKGROUND OF THE INVENTION

1. Field of the Invention

The present invention relates to a digital clock generator circuit for producing a modified clock signal which is synchronized with a sync signal having a time-base variation from a fixed, stable clock signal, and to a video signal time-base error corrector apparatus using the digital clock generator circuit.

2. Description of the Prior Art

A time-base error corrector (referred to as a TBC hereinafter) is used for compensating for a time base error attributed to a playback signal reproduced from a recording medium, e.g. a disk or tape. A digital TBC requires a modified clock signal synchronized with a sync signal of the playback signal.

In the prior art, the modified clock signal synchronized with a sync signal is generated by a PLL (phase locked loop) circuit. However, a loop filter and a VCO (voltage controlled oscillator) which are primary components of the PLL are commonly operable in an analog state, thus requiring delicate adjustment for desirable performance and suffering from interference with noise derived from an adjacent digital circuit to result in an unstable operation. To overcome such drawbacks, the PLL may be adapted for complete digital operation. In this case, when the digital PLL is required to operate at a high speed, its amount of arithmetical operation and bit rate will substantially increased so as to be too high to be practically implemented.

The digital PLL may be replaced by a digital phase synchronizing circuit as disclosed in Japanese Laid-open Patent Publication No. 62-110382(1989) wherein clock signals at the write and read sides of a RAM (random access memory) in a time-base error corrector are controlled separately. The clock signal control at the write side is executed by causing each reproduced sync signal to be in phase with a reference clock signal. The clock signal control at the read side is effected by detecting the duration of the reproduced sync clock signal, and producing a difference between the duration of the reproduced clock signal and the duration of the reference sync signal as a velocity error signal, and calculating a clock control amount through a polynomial operation of a previous series of the velocity error signals for phase modulation of the clock signal. In such a time-base error corrector, since a time base error is corrected by phase control on the clock signal at the read side of the RAM, a time-base error corrected signal will be obtained only in the analog state after D/A (digital-to-analog) conversion. In other words, such a prior art time-base error corrector cannot be digital interfaced with other digital devices. Also, the polynomial operation using a plurality of velocity error signals requires a continuous series of reproduced sync signals. Generally, a playback signal from a recording medium tends to have dropouts, and the absence of one of the series of the reproduced sync signals will cause consumption of a considerable length of time before the polynomial operation produces a correct value.

SUMMARY OF THE INVENTION

It is an object of the present invention to provide an improved clock generator circuit composed of digital components which require no particular adjustment and provide stable operation, thus being highly feasible in pragmatical production.

It is another object of the present invention to provide an improved time-base error corrector which is less affected by sync signal dropouts and allows digital interfacing.

For achievement of the foregoing objects, a clock generator circuit of the present invention comprises: a zero hold circuit responsive to each pulse edge of an external sync signal for generating a zero hold clock signal which is in phase with the external sync signal from a fixed clock signal which is stable in phase and frequency; a phase comparator circuit for producing phase difference data indicative of a phase difference between the external sync signal and an internal sync signal; a counter for counting pulses of the zero hold clock signal to obtain count data, the counter being cleared in response to each occurrence of the external sync signal; a memory for receiving, as its input address, the phase difference data and the count data and for delivering the internal sync signal to the phase comparator circuit when the count data of the counter reaches a given number which is smaller than a number of pulses in one cycle of the external sync signal in the absence of time-base variations and for producing a phase control signal determined by the phase difference data and the count data; and a phase shifter circuit for producing a modified clock signal by phase shifting the zero hold clock signal according to the phase control signal.

Also, a time-base error corrector of the present invention comprises: a sync signal separator circuit for separating a horizontal sync signal from an input analog video signal and delivering it as an external sync signal; a quartz oscillator circuit for generating a fixed clock signal which is stable in phase and frequency; a zero hold circuit responsive to each pulse edge of the external sync signal for producing a zero hold clock signal which is in phase with the external sync signal from the fixed clock signal; a phase comparator circuit for producing phase difference data indicative of a phase difference between the external sync signal and an internal sync signal; a counter for counting pulses of the zero hold clock signal and delivering its count data, the counter being cleared in response to each occurrence of the external sync signal; a first memory for receiving, as its input address, the phase difference data and the count data and for delivering the internal sync signal to the phase comparator circuit when the count data of the counter is a given number which is smaller than a number of pulses in one cycle of the external sync signal in the absence of time-base variations, and for producing a phase control signal determined by the phase difference data and the count data; a phase shifter circuit for producing a modified clock signal by phase shifting the zero hold clock signal according to the phase control signal; an A/D (analog-to-digital) converter for converting the input analog video signal to a digital video signal using the modified clock signal; and a second memory for writing thereinto the digital video signal with the modified clock signal and reading therefrom the written digital video signal with the fixed clock signal to obtain a time-base variation compensated digital video signal.

The zero hold clock signal is produced by the zero hold circuit from the fixed clock signal and the external sync signal. The pulses of the zero hold clock signal are counted with the counter which in turn delivers its count data for driving a lower address of the memory to produce the internal sync signal. The phases of external and internal sync signals are compared by the phase comparator circuit which generates and delivers the phase difference data to an upper address of the memory. The memory then delivers the phase control signal which is determined by the phase difference data and controlled by the count data of the counter. Upon receiving the phase control signal, the phase shifter circuit shifts the phase of the zero hold clock signal to produce a modified clock signal which is in phase with and equal in frequency to the external sync signal.

The application of the clock generator circuit to a TBC allows an analog video signal having a time-base variation to be converted to a digital form. The digital video signal is written into the second memory using the modified clock signal which has the same time-base variation as that of the input video signal and then, read out using the fixed clock signal which has no time-base variations so that time-base errors in the video signal can be eliminated.

Accordingly, the clock generator circuit of the present invention composed of digital components with no use of an analog PLL requires no particular adjustment for control and can thus operate stably regardless of noise. The clock generator circuit is suitable to implementation on an IC chip. The time-base error corrector of the present invention permits the phase of the modified clock signal to be determined on the detection of the external sync signal twice in succession, ensuring the generation of the modified clock signal from an input video signal that contains a number of dropouts and correcting the time-base variations in the video signal accurately. The time-base error corrector is capable of providing digital interface with no difficulty and will thus be advantageous for use in an analog recording video disk player or VCR.

DESCRIPTION OF THE PREFERRED EMBODIMENTS

Preferred embodiments of the present invention will be described referring to the accompanying drawings.

Figure 1:
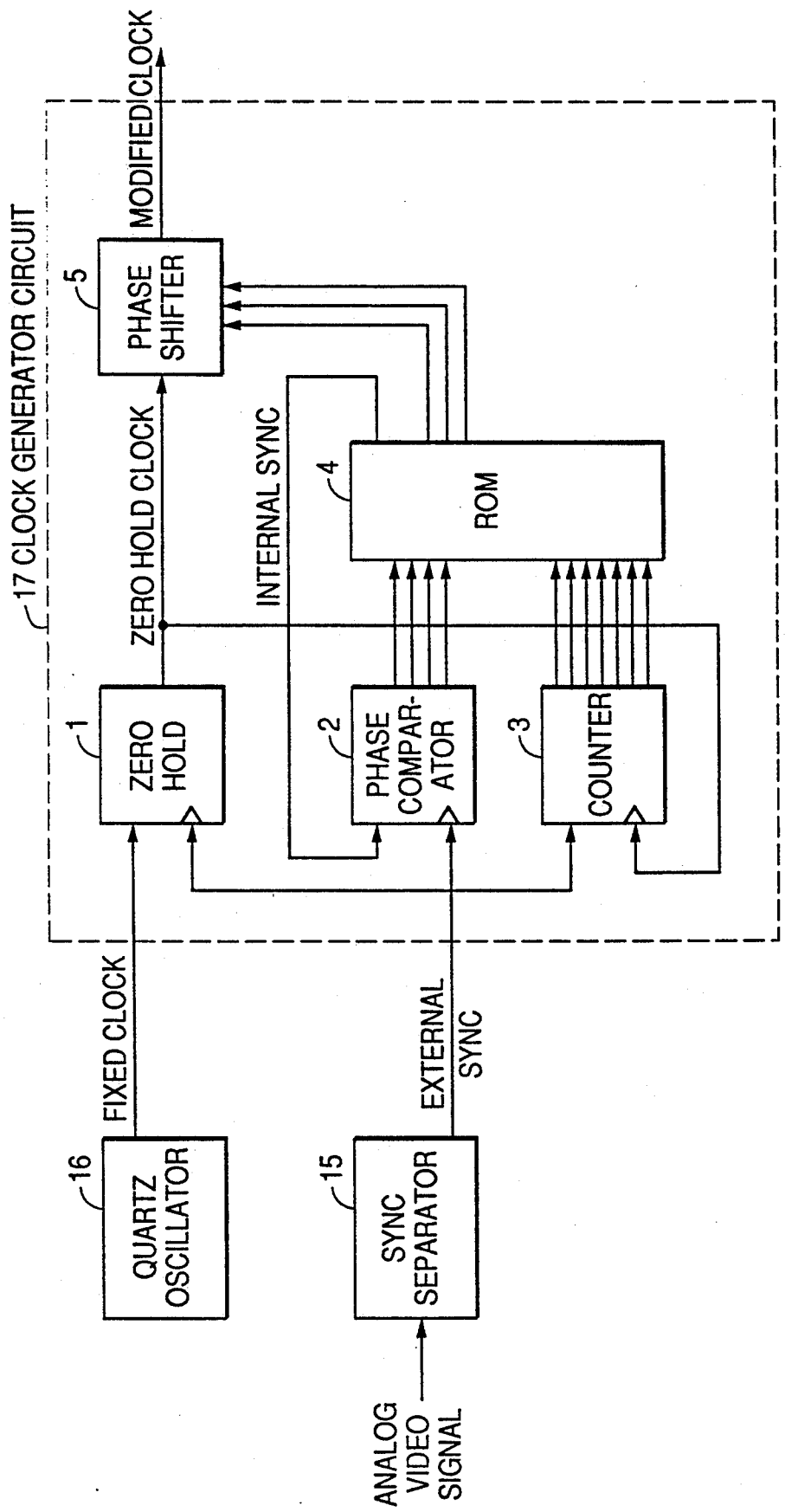
FIG. 1 is a block diagram of a clock generator circuit showing one embodiment of the present invention.
Figure 7:
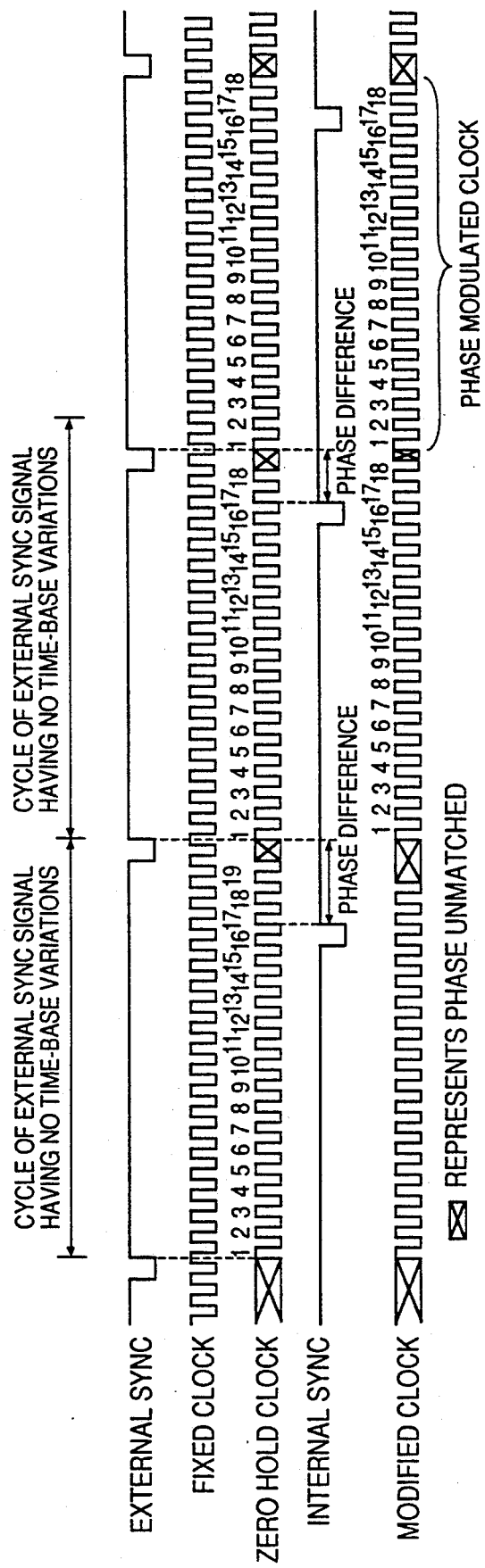
FIG. 7 is a waveform diagram of relevant signals associated with the clock generator circuit of the present invention.

FIG. 1 is a block diagram showing a clock generating circuit showing one embodiment of the present invention. FIG. 7 illustrates waveforms of pertinent signals in the clock generating circuit. As shown in FIG. 1, a zero hold circuit 1 is provided for causing a pulse edge of an external sync signal, which has been separated by a sync signal separating circuit 15 from an input analog video signal, to be in phase with a pulse edge of a fixed clock signal generated from a quartz oscillator circuit 16 to produce a zero hold clock signal. The phase of the zero hold clock signal remains constant before arrival of a succeeding edge of the external sync signal. A phase comparator circuit 2 is provided for determining a phase difference between the external sync signal and an internal sync signal, which is to be delivered as phase difference output data of a binary data form. A counter 3 is provided for counting the number of pulses of the zero hold clock signal. The counter 3 is cleared of its count data on receipt of each pulse of the external sync signal. A ROM (read only memory) 4 receives the phase difference data from the phase comparator circuit 2 as the upper bits of an input address and the count data from the counter 3 as the lower bits of the input address. The ROM 4 outputs the internal sync signal as a first output when the number of clock pulses counted by the counter 3 is a given number smaller than the number which is of sync pulses corresponding to one cycle of the external sync signal which is assumed to have no time-base variations. Also, the ROM 4 delivers, as a second output, a phase control signal z which satisfies a condition expressed by an equation (4) shown later, where the upper bits of the address are denoted by x, the lower bits are denoted by y, and a constant is c. A phase shifter circuit 5 is provided for producing a plurality of different phase clock signals from the input zero hold clock signal and for selecting, upon receiving the phase control signal z from the ROM 4, one of the different phase clock signals for delivery as a modified sync clock output.

Figure 2:
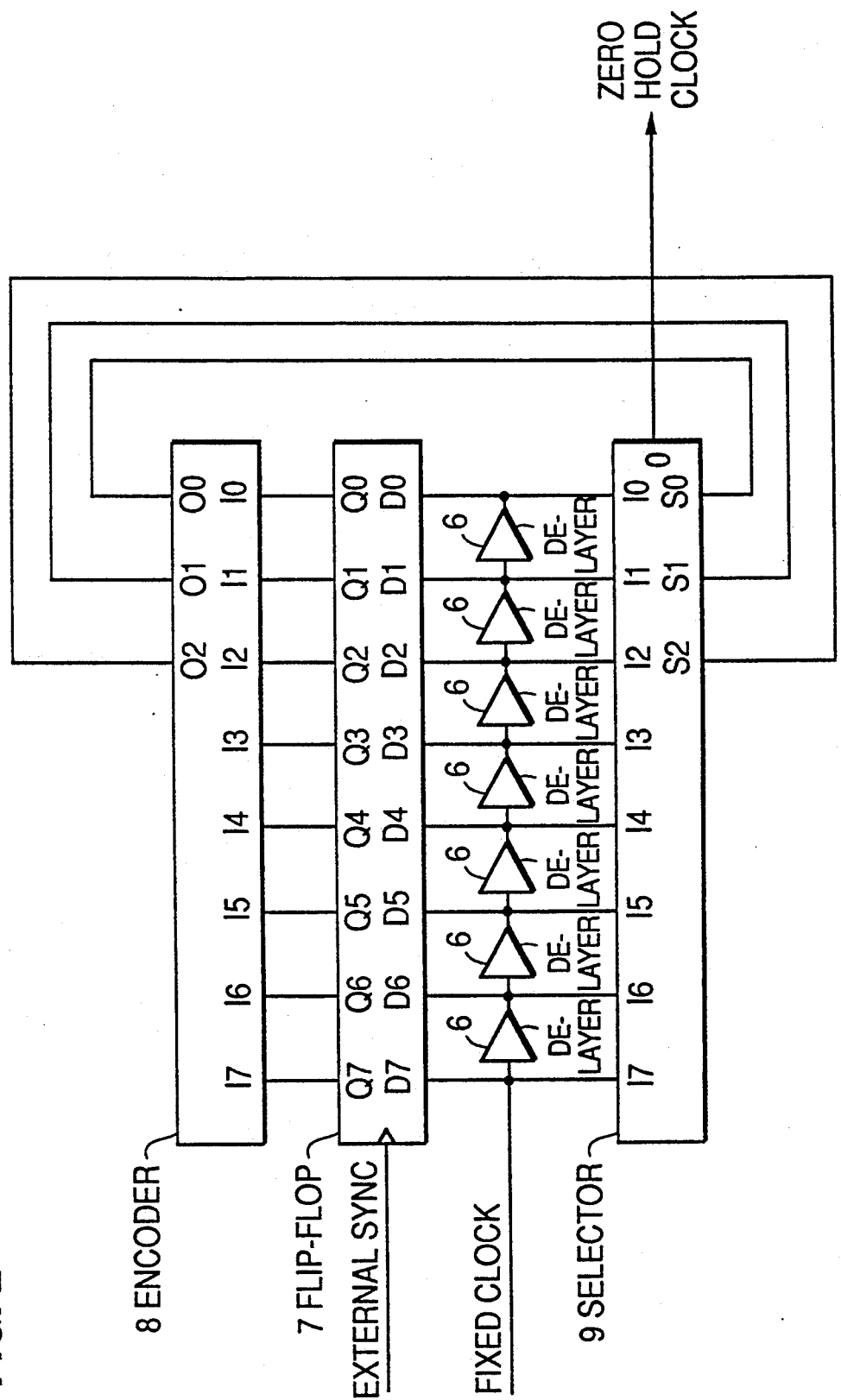
FIG. 2 is a detailed circuit diagram of a zero hold circuit in the embodiment shown in FIG. 1.
Figures 6, 8, 9:
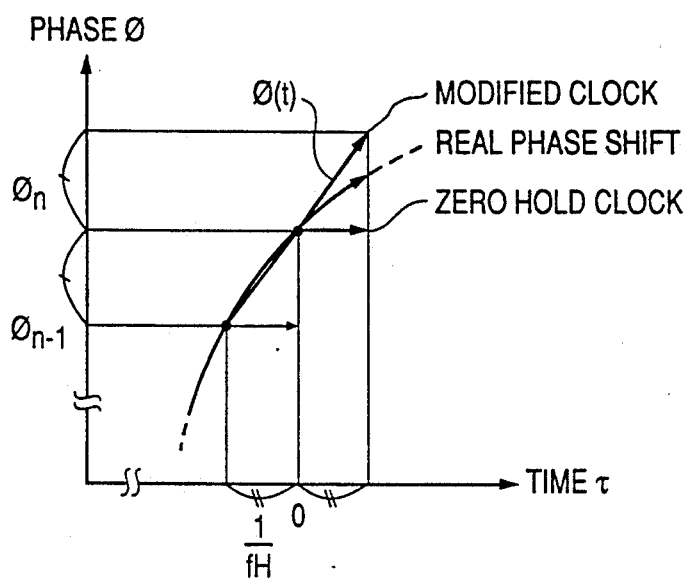
FIG. 6 is a graphic diagram explaining the action of the clock generator circuit of the present invention.
FIG. 8 is an encoding table of an encoder illustrated in FIG. 2.
FIG. 9 is an encoding table of a priority encoder illustrated in FIG. 3.

The components in a sync clock generator circuit 17 of the embodiment shown in FIG. 1 will be described in more detail. FIG. 2 illustrates one example of the zero hold circuit 1 whose output, or zero hold clock signal, is arranged in phase with the pulse edge of the external sync signal at an accuracy of $\frac{1}{8}$ of the period of the fixed clock signal. Seven delayers 6 are provided, each delayer 6 having a delay time equal to $\frac{1}{8}$ of the period of the fixed clock signal; an 8-bit flip-flop 7, an encoder 8 having eight inputs and three outputs for a specific encoding as shown in FIG. 8, and a selector 9 having eight inputs and one output and arranged to receive a 3-bit control signal are also provided. In operation, 8 different phase clock signals are generated from the fixed clock signal at the respective inputs, outputs and connection points of the delayers 6. The 8 clock signals are latched by a leading edge of the external sync signal in the flip-flop 7. Assuming that the duty cycle of the fixed clock signal is 50%, the output of the flip-flop 7, namely, an input to the encoder 8, is determined to be one of the eight patterns of FIG. 8. Then, the encoder 8 sends 3-bit selection data corresponding to its input signal to the selector 9 which in turn selects and deliver one of the 8 different phase signal patterns as a zero hold clock signal, as shown in FIG. 2. The selected zero hold clock signal has its leading edge out of phase at a minimum degree with the corresponding leading edge of the external sync signal. In other words, the zero hold clock signal delivered from the selector 9 is approximately in phase with the external sync signal. The in-phase accuracy depends on the delay time of the delayers 6. Accordingly, it is understood that a higher accuracy is established by a smaller delay time and a larger number of the delayers involving a relatively increased number of bits to be handled by the flip-flop 7, the encoder 8, and the selector 9. Also, the selection of a zero hold clock output is triggered by each leading edge of the external sync signal to the flip-flop 7. Hence, the phase of the clock signal remains unchanged until detection of a succeeding leading edge of the external sync signal.

Figure 3:
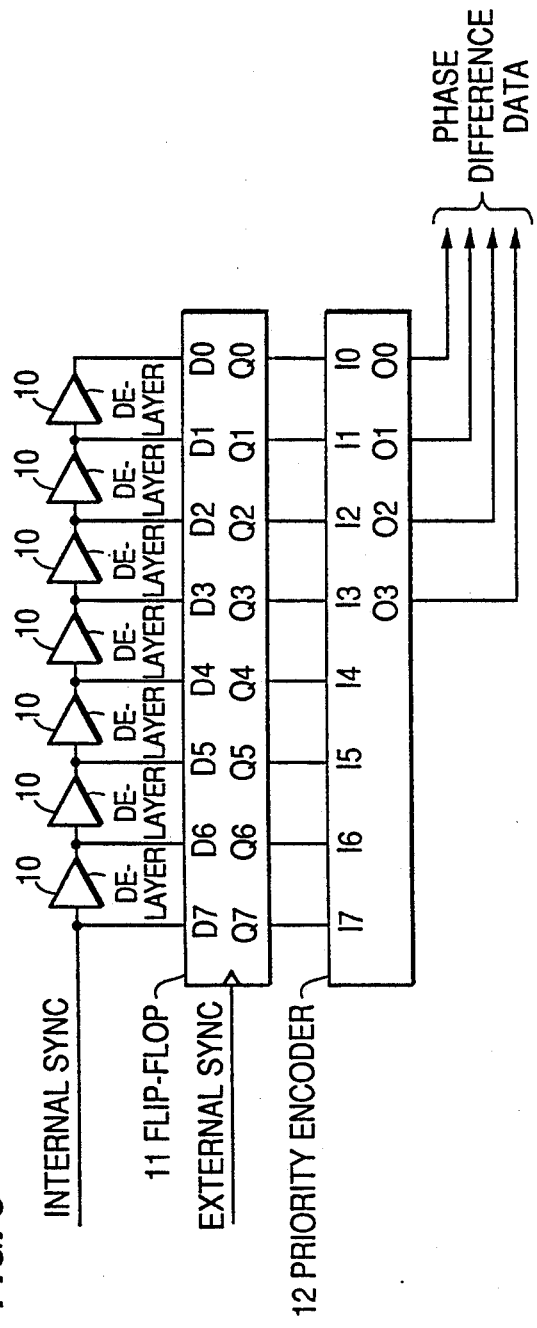
FIG. 3 is a detailed circuitry diagram of a phase comparator circuit in the embodiment shown in FIG. 1.

FIG. 3 shows one example of the phase comparator circuit 2 in which delayers 10 are for delaying the internal sync signal, the delay time of each delayer determining the resolution of a phase comparing action and the number of delayers defining a pull range for the phase comparing action. A flip-flop 11 and a priority encoder 12 having a code table shown in FIG. 9 are also provided. When delayed segments of the internal sync signal are latched in a row at the inputs and outputs of the seven delayers 10 in response to the leading edge of the external sync signal of the flip-flop 11 during transmission through the seven delayers 10, the input to the priority encoder 12 is determined by selection from the nine different output patterns shown in FIG. 9. Hence, the priority encoder 12 delivers a corresponding code output of a digital form which represents a phase difference between the internal sync signal and the external sync signal.

Figure 4:
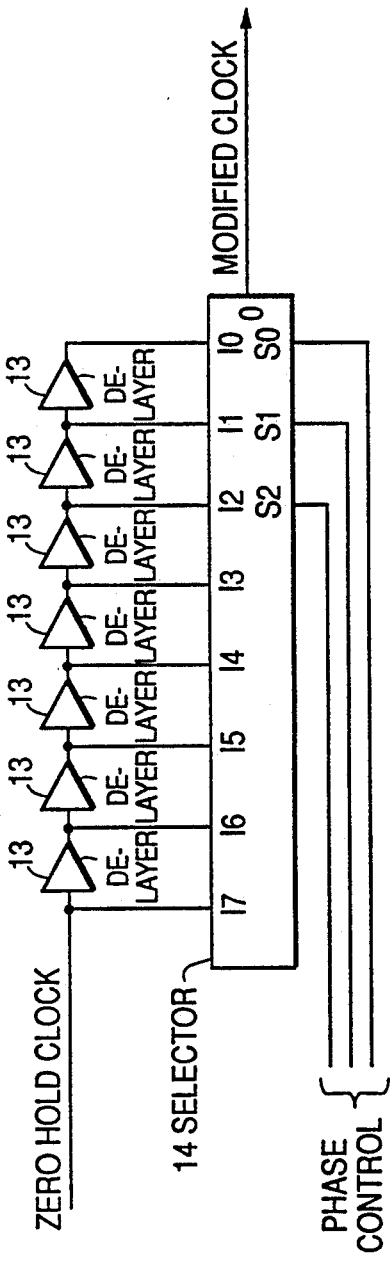
FIG. 4 is a detailed circuit diagram of a phase shifter circuit in the embodiment shown in FIG. 1.
Figure 10:
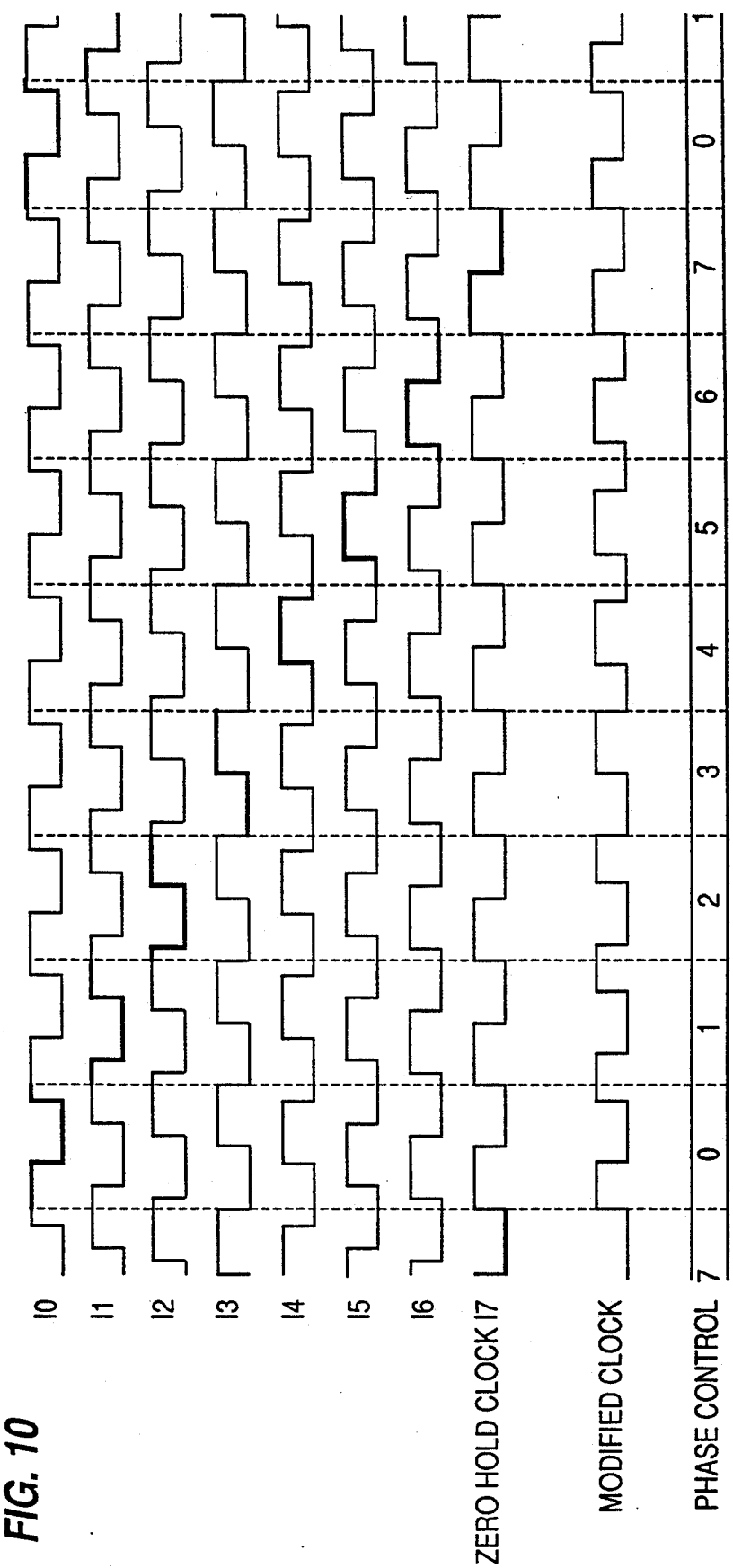
FIG. 10 is a waveform diagram of the relevant signals timed in the phase shifter circuit of the clock generator circuit.

FIG. 4 illustrates one example of the phase shifter circuit 5 in which the phase of a modified sync clock output is controlled at an accuracy equivalent to $\frac{1}{8}$ of the period of the zero hold clock signal. Seven delayers 13 are provided, each delayer having a delay time equal to $\frac{1}{8}$ of the period of the zero hold clock signal and a selector 14 is provided for selecting and delivering one of the eight different clock signals in response to the phase control signal from the ROM 4. In operation, a input zero hold clock signal is phase shifted by a delay time by each of the delayers 13 and the resultant delayed outputs are transmitted to the selector 14. The delayed outputs loaded to their respective inputs I7,I6,I5,I4,I3,I2,I1,I0 of the selector 14 are transformed to a row of pulses delayed in the phase by one addition of the delay time of each delayer 13 after another. It should be appreciated that I7 is continuous in the phase to I0 so that the output clock signal is constructed of a chain of phase controlled pulses by repeating a set of the phase control signals 0 to 7. More specifically, the zero hold clock signal is phase modulated to a modified sync clock signal by increasing or decreasing the values of the phase control signals in succession. FIG. 10 shows an example of the waveforms of the foregoing signals in the phase circuit 5. While the zero hold clock signal is fed to the input I7, resultant delay outputs from the delayers 13 appear as denoted by I6 to I0 in FIG. 10. As the phase control signal shifts from 0 to 7 and repeats the same from 0, pertinent clock pulse forms are selected to constitute a modified sync clock signal which appears to be phase modulated.

The operation of the clock generator circuit 17 shown in FIG. 1 will now be explained. The zero hold clock signal is produced by the zero hold circuit 1 from the fixed clock signal and the external sync signal. The pulses of the zero hold clock signal are counted by the counter 3 which in turn delivers count data for driving the lower address of the ROM 4 to produce the internal sync signal. The external and internal sync signals are compared in phase to each other by the phase comparator circuit 2 which generates and delivers phase difference data to the upper address of the ROM 4. The ROM 4 then delivers the phase control signal which is determined by the phase difference data and controlled by the count data of the counter 3. Upon receiving the phase control signal, the phase shifter circuit 5 shifts the phase of the zero hold clock signal to produce a modified clock signal which is in phase with and equal in frequency to the external sync signal.

The phase accuracy in the zero hold circuit 1, the phase comparator circuit 2, and the phase shifter circuit 3 in the clock generator circuit depends largely on the delay durations of their respective delayers 6, 10, and 13 and will be determined to a desired degree by employing any appropriate delayers. Resultant variations in the phase resolution of the phase comparator circuit 2 and in the phase control sensitivity in the phase shifter circuit 5 may be controlled by changing the value of the internal constant c in the ROM 4. It would be understood that the present invention is not limited to the above embodiment in which seven of the delayers defining n=m=8 are installed in each of the zero hold circuit 1, the phase comparator circuit 2, and the phase shifter circuit 5. Also, the number of pulses of the fixed clock signal for one cycle of the external sync signal which has no time-base variations is not limited to 20 specified in the foregoing embodiment as shown in FIG. 7.

Preferably, the number of clock pulses in one cycle of the external sync signal is 1800 at 18 KHz of the external sync signal having no time-base variations and 32.4 KHz of the fixed clock signal. This will be implemented with the zero hold circuit 1 containing 15 delayers whose delay time is 2 nsec as satisfying n=16 and the phase comparator circuit 2 having 63 delayers to satisfy m=64, where the phase control accuracy is acceptable for practical application and the circuitry arrangement is feasible for neat fabrication.

The quartz oscillator circuit 16 in the embodiment may be replaced by any oscillator capable of producing fixed clock pulses or the fixed clock signal itself may be supplied from an outside source. Also, the sync signal separating circuit 15 for extracting a sync signal component from an analog video signal may be eliminated if the external sync signal is directly introduced. The ROM 4 may be replaced by a RAM (random access memory) which can change memory data according to operative conditions.

The operation of the circuit will be described referring to the relevant formulas and graphic representations. Assuming that the phase of the external sync signal is $\phi_n$, the phase of a previous external sync signal is $\phi_{n-1}$, and the phase resolution of the phase comparator circuit 2 is a, the output phase difference x is expressed by:

$$X = \frac{\phi_n - \phi_{n-1}}{a} \qquad (1)$$

Also, when the frequency of the zero hold clock signal is $f_{ck}$, the count output y of the counter 3 based on a duration t of time after the detection of the current external sync signal is calculated from:

$$y = f_{ck} \cdot t \qquad (2)$$

When the phase of the input clock signal to the phase shifter circuit 5 is $\phi_{in}$, the phase of the output clock signal from the same is $\phi_{out}$, the value of the phase control signal is z, and the phase control sensitivity is b, their relationship is expressed as:

$$\phi_{out} = \phi_{in} + b \cdot z \qquad (3)$$

Hence, the upper address value x and the lower address value y of the ROM 4 and the output phase control signal z are expressed by:

$$z = c \cdot x \cdot y \qquad (4)$$

where c is a constant determined by the following equation (5) at the frequency $f_H$ of the external sync signal.

$$c = \frac{a}{b} \cdot \frac{f_H}{f_{CK}} \qquad (5)$$

Accordingly, if the phase of a modified clock signal is $\phi(t)$ at the time t, the equation (4) is expressed using the equations (1), (2), and (5) by:

$$\phi(t) = \phi_n + (\phi_n - \phi_{n-1}) \cdot f_H \cdot t \qquad (6)$$

The statement (6) is exemplarily shown in FIG. 6 where the curve of the phase $\phi(t)$ of the modified clock signal at the time t following the detection of the phase $\phi_n$ of the external sync signal, which starts at t=0, is approximated by a straight line extending from $\phi_{n-1}$ to $\phi_n$ for one cycle of the external sync signal.

Figure 5:
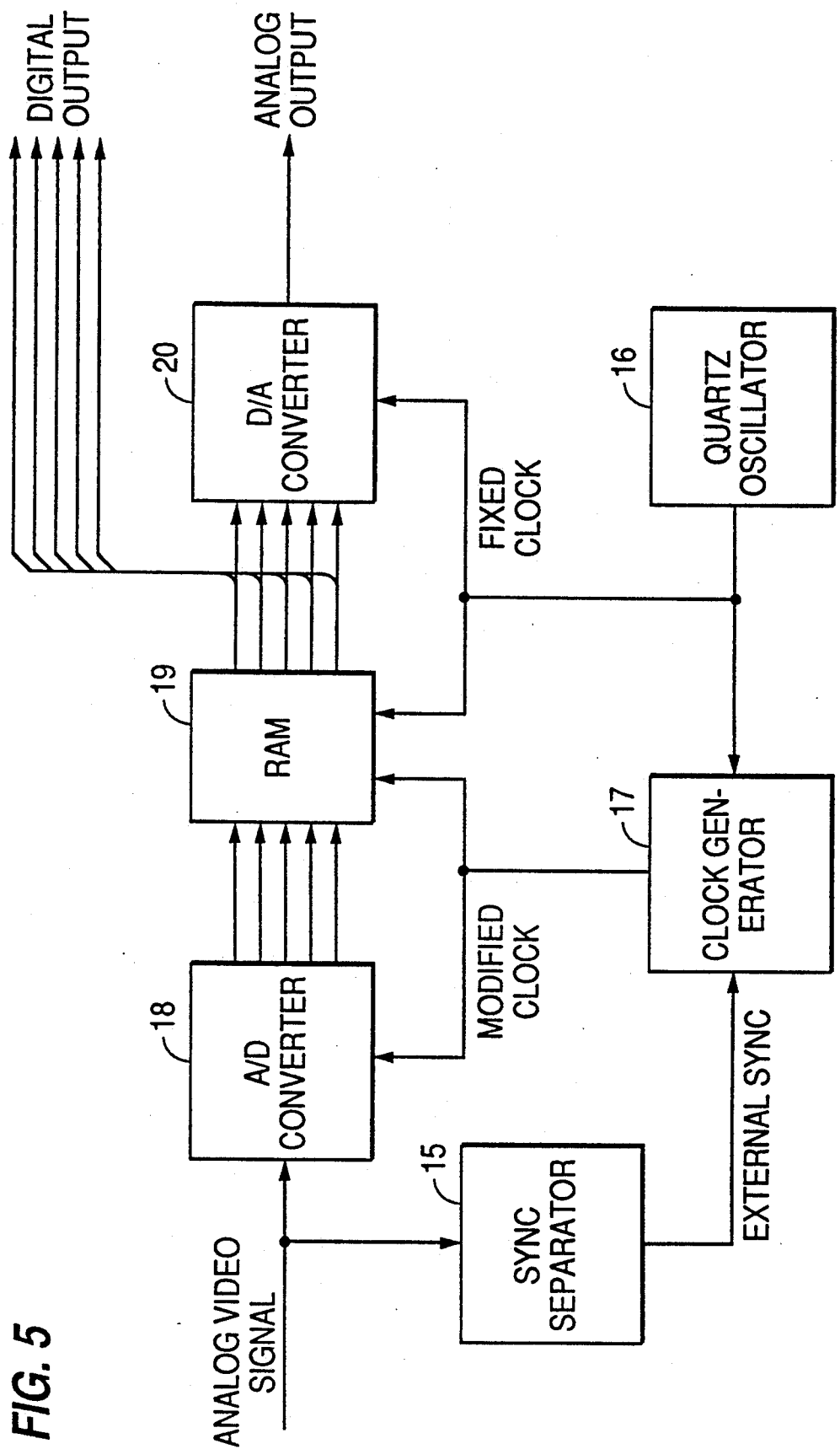
FIG. 5 is a block diagram of a time-base error corrector showing another embodiment of the present invention.

Another embodiment of the present invention will now be described in the form of a time-base error corrector containing the clock generator circuit. FIG. 5 is a block diagram of the time-base error corrector. A sync signal separating circuit 15 is provided for separating a horizontal sync or burst component from an input analog video signal and delivering it as the external sync signal, a quartz oscillator circuit 16 is provided for generating a fixed clock signal constant in phase and frequency, and a clock signal generator circuit 17 is provided for producing from the external sync signal and the fixed clock signal a modified clock signal attributed to the time-base variations of the external sync signal, which is identical in construction to that of the first embodiment and will be explained in no more details. Also, an A/D converter 18 is provided for converting the input analog video signal to a digital video signal with the modified clock signal; a RAM (random access memory) 19 is provided for compensating for time-base variations in the digital video signal through writing the digital video signal with the modified clock signal and reading the same with the fixed clock signal, and a D/A converter 20 is provided for converting the digital video signal which has been compensated for time-base error to an analog form.

In operation, the analog video signal containing time-base variations is converted to its digital form using the modified clock signal which has the same time-base variations as of the analog video signal. The digital video signal is stored in the RAM 19 and then, retrieved using the fixed clock signal which has no time-base variations so that the time-base variations are eliminated.

The time-base error corrector constituted as above allows a digital output having no time-base variations to be retrieved directly from the RAM while an analog output through the D/A converter from the RAM is accessed with the fixed clock signal. Accordingly, as the digital interface is possible, the digital output can be processed further if desired.

What is claimed is:

1. A clock generator circuit comprising:
   a zero hold circuit, responsive to each pulse edge of an external sync signal, for generating a zero hold clock signal which is in phase with the external sync signal from a fixed clock signal which is constant in phase and frequency;
   a phase comparator circuit for producing phase difference data indicative of a phase difference between the external sync signal and an internal sync signal;
   a counter for counting pulses of the zero hold clock signal to obtain count data, the counter being cleared by each occurrence of the external sync signal;
   a memory for receiving, as its input address, the phase difference data and the count data and for delivering the internal sync signal to the phase comparator circuit when the count data of the counter reaches a given number which is smaller than a number of pulses in one cycle of the external sync signal in the absence of time-base variations, and for producing a phase control signal determined by the phase difference data and the count data; and
   a phase shifter circuit for producing a modified clock signal by phase shifting the zero hold clock signal according to the phase control signal.

2. A clock generator circuit according to claim 1, wherein the zero hold circuit comprises an (n−1) number of delayers (n is an integer equal to or greater than 2) arranged in series for delaying the fixed clock signal, an n-bit flip-flop responsive to each pulse edge of the external sync signal for latching n clock segments of the fixed clock signal appearing at input, output and connection lines of the delayers, an encoder for encoding each output of the flip-flop to a clock selecting data, and a selector for selecting one of the n clock signal segments in response to the clock selecting data to obtain the zero hold clock signal.

3. A clock generator circuit according to claim 1, wherein the phase comparator circuit comprises an (m−1) number of delayers (m is an integer equal to or greater than 2) arranged in series for delaying the internal sync signal, an m-bit flip-flop responsive to each pulse edge of the external sync signal for latching m clock segments of the internal sync signal appearing at input, output and connection lines of the delayers, and a priority encoder for encoding each output of the flip-flop to the phase difference data.

4. A clock generator circuit according to claim 1, wherein the memory is arranged to produce a phase control signal z which is defined by $z = c \cdot x \cdot y$ where x is an upper value of the input address, y is a lower value of the input address, and c is a constant.

5. A time-base error corrector comprising:
   a sync signal separator circuit for separating a horizontal sync signal from an input analog video signal and delivering it as an external sync signal;
   a quartz oscillator circuit for generating a fixed clock signal which is constant in phase and frequency;
   a zero hold circuit responsive to each pulse edge of the external sync signal for producing a zero hold clock signal which is in phase with the external sync signal from a fixed clock signal;

a phase comparator circuit for producing phase difference data indicative of a phase difference between the external sync signal and the internal sync signal;

a counter for counting pulses of the zero hold clock signal to obtain count data, the counter being cleared by each occurrence of the external sync signal;

a first memory for receiving, as its input address, the phase difference data and the count data and for delivering the internal sync signal to the phase comparator circuit when the count data of the counter reaches a given number which smaller than a number of pulses in one cycle of the external sync signal in the absence of time-base variations, and for producing a phase control signal determined by the phase difference data and the count data;

a phase shifter circuit for producing a modified clock signal by phase shifting the zero hold clock signal according to the phase control signal;

an analog-to-digital converter for converting the input analog video signal to a digital video signal using the modified clock signal; and a second memory for writing thereinto the digital video signal with the modified clock signal and for reading therefrom the written digital video signal with the fixed clock signal to obtain a time-base variation compensated digital signal.

6. A time-base error corrector according to claim 5, wherein the zero hold circuit comprises an $(n-1)$ number of delayers (n is an integer equal to or greater than 2) arranged in series for delaying the fixed clock signal, an n-bit flip-flop responsive to each pulse edge of the external sync signal for latching n clock segments of the fixed clock signal appearing at input, output and connection lines of the delayers, an encoder for encoding each output of the flip-flop to a clock selecting data, and a selector for selecting one of the n clock signal segments in response to the clock selecting data to obtain the zero hold clock signal.

7. A time-base error corrector according to claim 5, wherein the phase comparator circuit comprises an $(m-1)$ number of delayers (m is an integer equal to or greater than 2) arranged in series for delaying the internal sync signal, an m-bit flip-flop responsive to each pulse edge of the external sync signal for latching m clock segments of the internal sync signal appearing at input, output and connection lines of the delayers, and a priority encoder for encoding each output of the flip-flop to the phase difference data.

8. A time-base error corrector according to claim 5, wherein the first memory is arranged to produce a phase control signal z which is defined by $z = c \cdot x \cdot y$ where x is an upper value of the input address, y is a lower value of the input address, and c is a constant.

* * * * *